UNITED STATES PATENT OFFICE.

GEORGE E. BROWN AND JOHN W. BLACKWELL, OF WRENTHAM, MASSACHUSETTS.

COMPOSITION OF MATTER FOR SOLES OF SHOES, &c.

SPECIFICATION forming part of Letters Patent No. 460,842, dated October 6, 1891.

Application filed December 19, 1890. Serial No. 375,191. (Specimens.)

*To all whom it may concern:*

Be it known that we, GEORGE E. BROWN and JOHN W. BLACKWELL, citizens of the United States of America, residing at Wrentham, in the county of Norfolk and State of Massachusetts, have invented certain new and useful Improvements in Composition of Matter for Soles of Shoes, &c., of which the following is a specification.

Our invention has for its object the compounding of certain ingredients to be used for the soles of rubber and leather shoes, or to be secured to the ordinary sole, which will prevent slipping and lessen the amount of wear.

In carrying out our invention we use the following composition, taking about eighteen pounds of rubber gum, and as this is rolled out into sheets or strips we sprinkle it with a mixture which is composed of the following ingredients and of substantially the proportions specified, namely: litharge, ten pounds; whiting, twenty pounds; flowers of sulphur, eleven ounces; lamp-black, one-half pound, adding to this mixture coarse emery or other gritty substance in weight equaling the weight of the rubber and other ingredients. This mixture is sprinkled upon the rubber as it is rolled out until the mixture is thoroughly incorporated in the gum. The rolling is continued until the strips reach the desired width and thickness. These strips are then subjected to pressure in a hydraulic press under heat from ten to thirty minutes, depending upon the thickness of the material. The heat and pressure will harden the material; but will leave it sufficiently flexible to be used for the desired purposes.

We intend the material for use for the bottoms of soles of boots and shoes, either rubber or leather, or for like purposes.

The material as thus prepared will wear longer than ordinary rubber. Rubbers, as ordinarily made with the corrugated bottoms, prevent slipping until this rough surface wears off, and then a smooth surface is presented, which is very liable to slip. In the use of this material all slipping will be prevented, no matter how much wear it may be subjected to, by reason of the fact that the gritty material is incorporated through every part of the rubber, and this presents a surface that will not slip on wet and icy surfaces.

It may be found desirable to prepare the tires of bicycles by mixing with the rubber forming the same the gritty material, and our invention is broad enough to include such application.

Having thus described our invention, what we claim is—

The herein-described composition of matter for treating rubber, consisting of litharge, whiting, flowers of sulphur, lamp-black in substantially the proportions described, and a gritty substance equaling in weight the other ingredients and the rubber to which the mixture is applied.

In testimony whereof we affix our signatures in presence of two witnesses.

GEORGE E. BROWN.
  JOHN W. BLACKWELL.

Witnesses:
 J. E. POND, Jr.,
 CHAS. G. PERCIVAL.